United States Patent [19]

Sasaki et al.

[11] Patent Number: 5,615,406
[45] Date of Patent: Mar. 25, 1997

[54] ALLOY HAVING EXCELLENT CORROSION RESISTANCE AND ABRASION RESISTANCE, METHOD FOR PRODUCING THE SAME AND MATERIAL FOR USE IN PRODUCTION OF THE SAME

[75] Inventors: Kyoichi Sasaki, Numazu; Yoshihisa Kato, Tsushima, both of Japan

[73] Assignees: Toshiba Kikai Kabushiki Kaisha, Tokyo-to; Daido Steel Co., Ltd., Aichi-ken, both of Japan

[21] Appl. No.: 313,795

[22] Filed: Sep. 28, 1994

Related U.S. Application Data

[62] Division of Ser. No. 63,753, May 20, 1993, Pat. No. 5,249,883.

[30] Foreign Application Priority Data

May 21, 1992 [JP] Japan ................................. 4-154263

[51] Int. Cl.$^6$ ............................... B22F 3/105; B22F 3/15
[52] U.S. Cl. ................................ 419/14; 419/17; 419/23; 419/47; 419/49
[58] Field of Search ................................. 419/10, 14, 17, 419/23, 47, 49

[56] References Cited

U.S. PATENT DOCUMENTS

| | | | |
|---|---|---|---|
| 2,349,052 | 5/1944 | Ollier | 75/136 |
| 3,183,127 | 5/1965 | Gregory et al. | 148/31 |
| 3,244,506 | 4/1966 | Reen | 75/5 |
| 3,334,975 | 8/1967 | Quaas et al. | 29/191.6 |
| 4,011,054 | 3/1977 | Beyer et al. | 29/182.7 |
| 4,055,742 | 10/1977 | Brown et al. | 219/145 |
| 4,097,275 | 6/1978 | Horvath | 75/203 |
| 4,155,759 | 5/1979 | Brown | 75/239 |
| 4,249,945 | 2/1981 | Haswell et al. | 75/241 |
| 4,312,894 | 1/1982 | Brown et al. | 427/34 |
| 4,772,339 | 9/1988 | Ekemar et al. | 148/126.1 |
| 4,868,065 | 9/1989 | Maruyama et al. | 428/547 |
| 5,053,284 | 10/1991 | Noda et al. | 428/552 |
| 5,149,595 | 9/1992 | Kojo et al. | 428/552 |

FOREIGN PATENT DOCUMENTS

| | | |
|---|---|---|
| 460211 | 12/1991 | European Pat. Off. . |
| 0460211 | 12/1991 | European Pat. Off. . |
| 58-181470 | 10/1983 | Japan . |
| 63-157796 | 6/1988 | Japan . |
| 2023478 | 1/1980 | United Kingdom . |
| 2169318 | 7/1986 | United Kingdom . |
| 9109980 | 7/1991 | WIPO . |
| 01310 | 7/1991 | WIPO . |

*Primary Examiner*—Charles T. Jordan
*Assistant Examiner*—Chrisman D. Carroll
*Attorney, Agent, or Firm*—Cushman Darby & Cushman IP Group of Pillsbury Madison & Sutro LLP

[57] ABSTRACT

A process for preparing an alloy having excellent corrosion resistance and abrasion resistance is provided. The alloy is prepared by providing a powder mixture or VC-powder-containing wire having a matrix metal, including a VC powder having a particle diameter of 10 μm or less, and at least one member selected from the group consisting of an Fe-base alloy, a Co-base alloy and a Ni-base alloy. The powder mixture or VC-powder-containing wire is melted with a heat source having a high energy density. The resultant melt is then cooled to homogeneously crystallize and/or precipitate VC, such that the particle diameter of the VC is reduced to 5 μm or less in the matrix metal phase. Also disclosed is a process for preparing a surface-modified metallic member from a metallic member and an alloy prepared from the aforementioned process.

3 Claims, 14 Drawing Sheets

(×400)

(×50)

(×350)

(×400)

(×400)

(×400)

(×400)

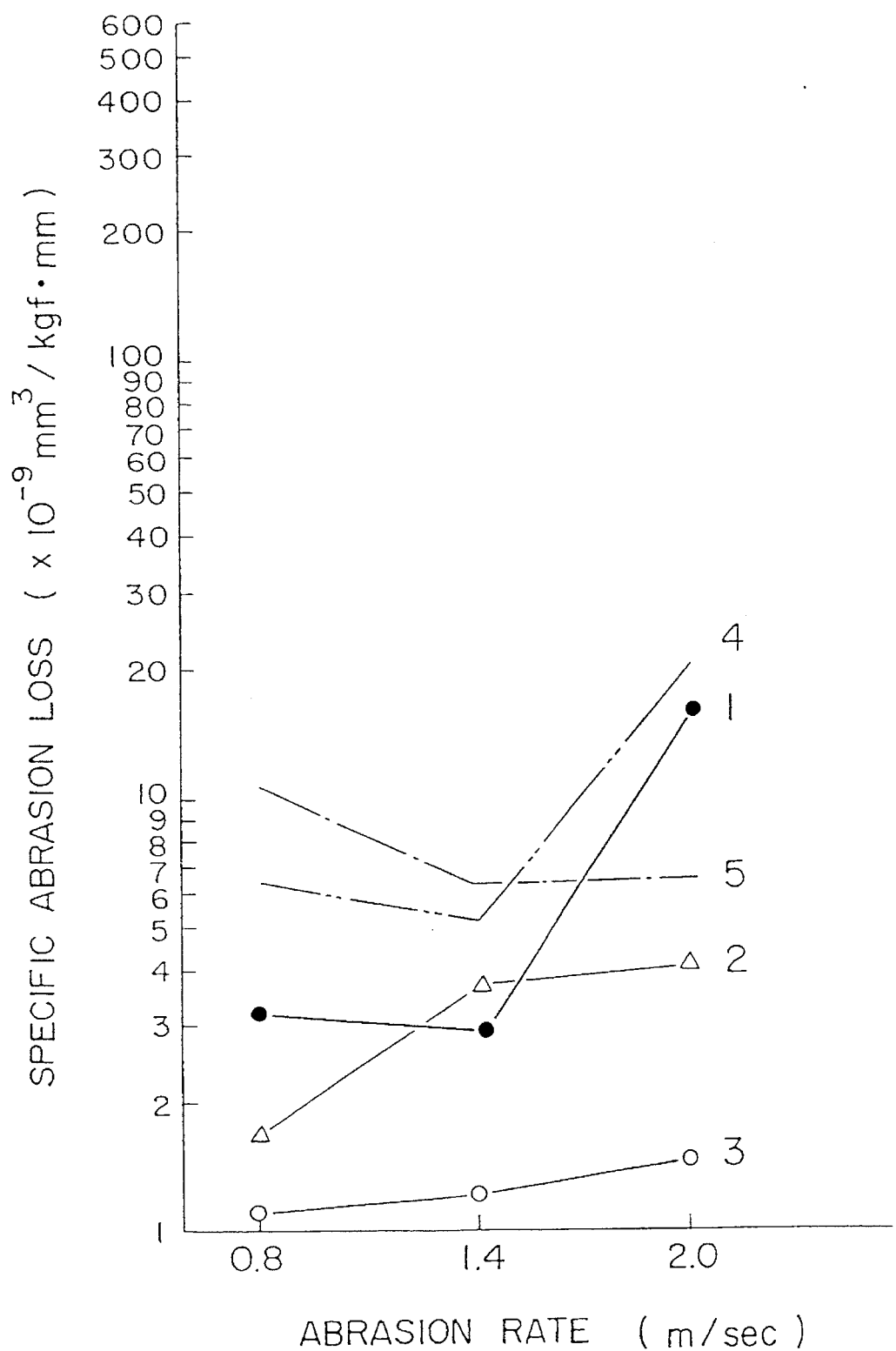
F I G. 8

(×400)

(×400)

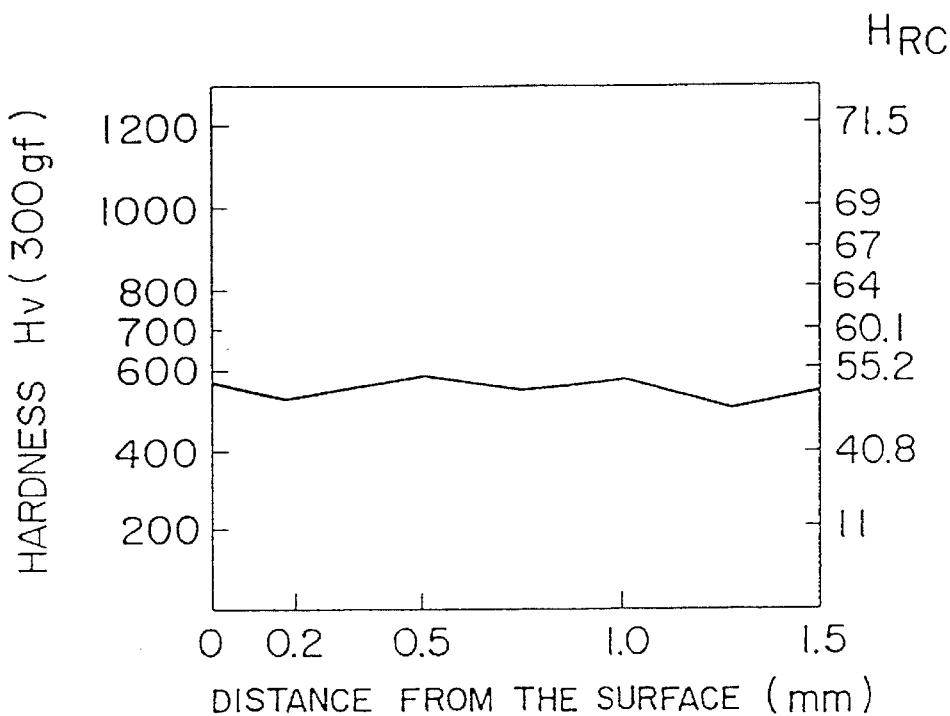
F I G. 13
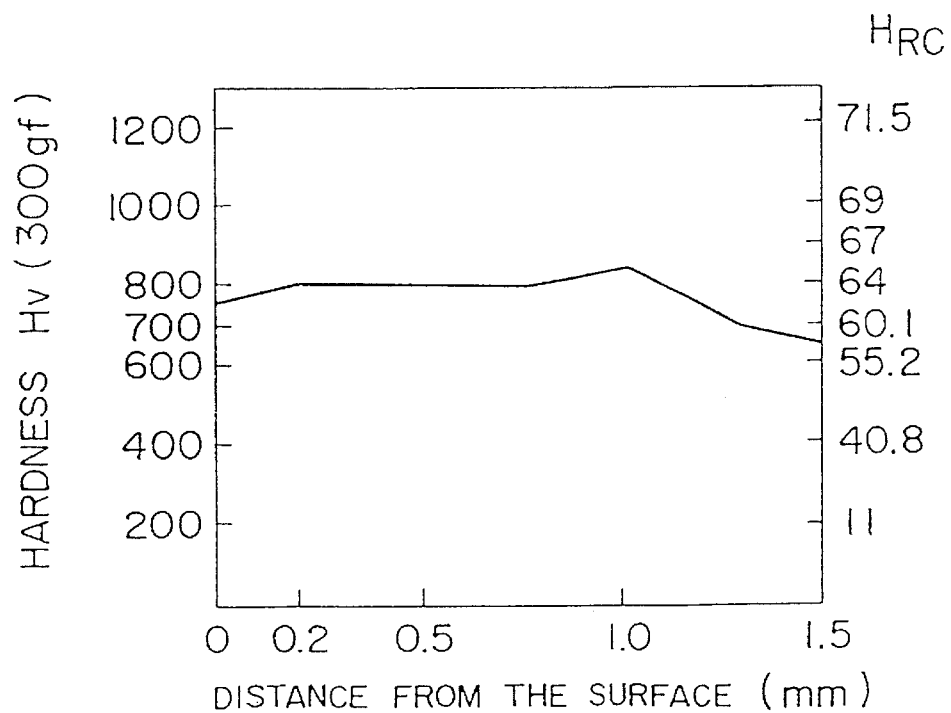
F I G. 14

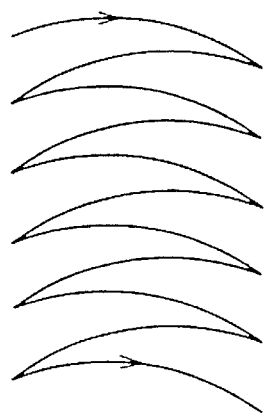
F I G. 18
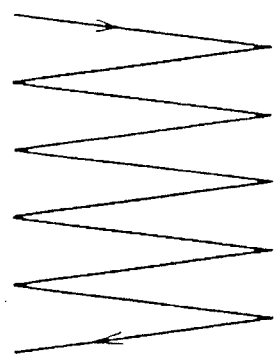
F I G. 19
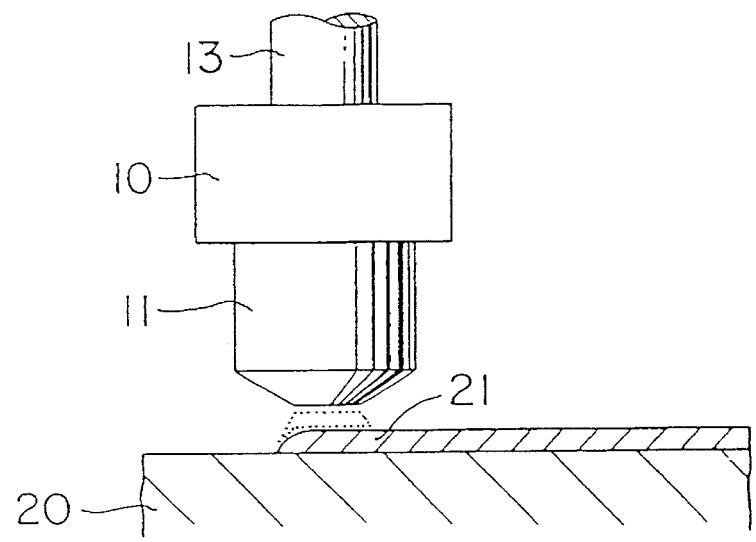
F I G. 20

3
ALLOY HAVING EXCELLENT CORROSION RESISTANCE AND ABRASION RESISTANCE, METHOD FOR PRODUCING THE SAME AND MATERIAL FOR USE IN PRODUCTION OF THE SAME

This is a division of application Ser. No. 08/063,753, filed May 20, 1993, now U.S. Pat. No. 5,249,883.

BACKGROUND OF THE INVENTION

The present invention relates to an alloy material excellent in both the corrosion resistance and abrasion resistance, a method for producing the same, a material for use in the production of the same, a metallic member using the same and a method for improving the corrosion resistance and abrasion resistance of the surface of said metallic member.

In general, in order to improve the corrosion resistance and abrasion resistance of metallic members constituting machinery, the surface of the metallic members has hitherto been modified, for example, by hardening or plating materials for constituting the metallic members, such as stainless steel.

Besides the above-described surface treatment method, various proposals have been made in recent years off a method wherein particular hard particles are added to metallic materials for constituting metallic members. Examples of such methods include a method as described in Japanese Patent Laid-Open Publication No. 181470/1983, wherein hard particles of WC, NbC, TiC, CrC, VC, etc. are added in a matrix metal comprising a Ni-base, Co-base or Fe-base alloy or to the surface of the matrix to improve the hardness or abrasion resistance of the matrix metal. The present inventors have found that although this method is effective to some extent in improving the abrasion resistance, it is not always satisfactory because the toughness of the alloy is disadvantageously lowered. For example, hard particles, such as NbC (melting point: 3480° C.) and TiC (melting point: 3180° C.), have a high melting point and are hard to melt, so that it is difficult to avoid the addition of the hard particles in an unmelted state. For this reason, there occurs a problem that, in the step of forming a corrosion-resistant and abrasion-resistant layer, the hard particles remain in a relatively large form in the matrix metal, which unfavorably gives rise to a lowering in the toughness of the metallic material.

Also, melting of a carbide as the additive in the matrix metal often leads to embrittlement of materials. For example, it is known that, when MoC or WC is melted together with a Ni-base, Co-base or Fe-base alloy, a brittle (fragile) $M_6C$ compound crystallizes. The crystallization of the brittle compound does not contribute to an improvement in the abrasion resistance and further results in embrittlement of the matrix metal.

Japanese Patent Laid-Open Publication No. 157796/1988 discloses a method for producing a roll for hot rolling. This method is directed toward the production of a roll having abrasion resistance and cracking resistance and being excellent in the toughness by adding a VC powder to an iron-base alloy, and the addition of a VC powder in an amount of 10% by weight or more to an iron-base alloy is essential to this method. In this method, however, an improvement in the hardenability is contemplated. According to the knowledge of the present inventors, when an Fe-base alloy is used as a parent metal, the addition of VC to the parent metal unavoidably gives rise to the formation of large amounts of a plurality of carbides, such as WC and CrC, so that the effect contemplated in the present invention is not always attained. Further, this method is not a technique for recrystallizing or reprecipitating VC in a particular state and is not always effective in improving both the abrasion resistance and corrosion resistance.

Further, in the conventional method, when hard particles are added, the temperature rise should be limited to the minimized degree necessary for the deposition of the matrix metal for the purpose of inhibiting the crystallization of the above-described fragile compounds. Further, in order to attain this purpose, it is necessary to increase the particle diameter of hard particles to be added to some extent. An increase in the particle diameter, however, makes it difficult to attain a homogeneous dispersion, which results in a lowering in the toughness of the metallic material. As described above, the presence of coarse hard particles in a heterogeneous distribution in the matrix metal causes these hard particles to easily fall off when they are subjected to frictional movement.

The above-described problems of heterogeneous distribution of hard particles and falling-off of hard particles attributable to the heterogeneous distribution of the hard particles are accelerated also by a difference in the specific gravity between the matrix metal and the hard particles. For example, the possibility of occurrence of aggregation or heterogeneous distribution of the hard particles becomes particularly high when an Fe-base alloy is used as the matrix metal with $Al_2O_3$, SiC or TiC being used as the hard particle. Further, when a Cr-base carbide is used as the hard particle, a carbide of Cr recrystallized or reprecipitated in the step of cooling after heating aggregates and grows into a coarse carbide particle, which leads to a problem that the hard particles become liable to fall off from the matrix metal.

International Publication WO91/09980 discloses a method for producing an alloy having excellent resistance to corrosion and abrasion, which comprises subjecting a powder mixture comprising a metallic powder of at least one alloy selected from Fe-base, Co-base and Ni-base alloys and a vanadium carbide powder having a particle diameter of 60 to 100 μm to melting and/or repetition of re-melting with a heat source having a high energy density. The use of the powder having a relatively large particle diameter has an advantage of facilitating the alloying. In this method, however, although fine vanadium carbide particles having a diameter of 10 μm or less crystallize and precipitate, since some vanadium carbide particles remain unmelted, the troublesome melting step should be repeated many times to melt the vanadium carbide particles remaining unmelted. Further, observation under a microscope by the present inventors has revealed that part of the unmelted vanadium carbide is present in a massive form nevertheless, so that a fine vanadium carbide particle phase heterogeneously distributes, which unfavorably makes it impossible to attain an intended abrasion resistance and often causes occurrences of cracking and peeling due to local breaking.

DISCLOSURE OF THE INVENTION

The present invention can solve the above-described problems of the prior art. Specifically, according to one aspect of the present invention, there is provided an alloy having excellent corrosion resistance and abrasion resistance, comprising a matrix metal phase comprised of at least one member selected from an Fe-base alloy, a Co-base alloy and a Ni-base alloy and, present in said matrix metal phase, 10 to 65%, in terms of area, of a substantially homogeneously crystallized and/or precipitated VC particle phase having a particle diameter of 5 μm or less.

According to another aspect of the present invention, there is provided a surface-modified metallic member, comprising a metallic member and the above-described alloy, said alloy being integrally coated on the surface of said metallic member at its desired portion.

According to a further aspect of the present invention, there is provided a method for producing an alloy having excellent corrosion resistance and abrasion resistance, comprising melting a powder mixture or VC-powder-containing wire comprising a matrix metal comprised of at least one member selected from an Fe-base alloy, a Co-base alloy and a Ni-base alloy and a VC powder having a particle diameter of 10 μm or less with a heat source having a high energy density and then cooling the resultant melt to homogeneously crystallize and/or precipitate VC having a particle diameter of 5 μm or less in said matrix metal phase.

The melting with a heat source having a high energy density may be effected by any of plasma welding, laser beam and H.I.P. (hot isostatic press).

When the above-described production method is applied to a desired portion of a metallic member, it can be used also as a method for producing a surface-modified metallic member having an alloy layer excellent in corrosion resistance and abrasion resistance on a predetermined surface of the metallic member.

Further, a cored wire comprising a pipe of the above-described matrix metal filled with a VC powder having a particle diameter of 10 μm or less, or a powder mixture comprising the aboverdescribed matrix metal and a VC powder having a particle diameter of 10 μm or less may also be used as a material in the production of the alloy material.

When the vanadium carbide powder used in combination with the matrix metal is a finely divided powder having a particle diameter of 10 μm or less, the VC powder can be completely melted and dissolved in the matrix metal phase by a single melting operation with a heat source having a high energy density and a fine VC particle phase having a size of 5 μm or less can be homogeneously precipitated and/or crystallized by subsequent cooling. A percentage area of the VC particle phase relative to the matrix metal phase in the range of from 10 to 65% can be easily ensured by regulating the material and heat treatment conditions, which enables the corrosion resistance and abrasion resistance to be stably developed.

BRIEF DESCRIPTION OF THE DRAWINGS

FIG. 8 is a graph showing the results of an abrasion test for corrosion-resistant and abrasion-resistant alloys prepared in Examples 1 to 3 of the present invention;

FIG. 13 is a graph showing the results of measurement of the hardness of a metallic member having a surface modified by the first method described in Example 4 of the present invention;

FIG. 14 is a graph showing the results of measurement of the hardness of a metallic member having a surface modified by the second method described in Example 4 of the present invention;

FIG. 18 is an explanatory view of a weaving pattern;

FIG. 19 is an explanatory view of another weaving pattern;

FIG. 20 is a schematic view of a plasma transferred arc welder used in the method of the present invention;

BEST MODE FOR CARRYING OUT THE INVENTION

Figure 1:
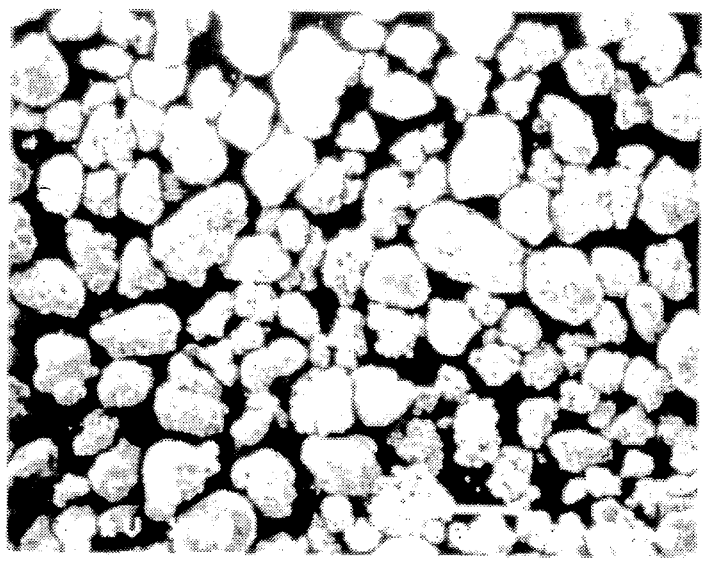
FIG. 1 is a photomicrograph of a granulated powder used in an example of the present invention.

In the corrosion-resistant and abrasion-resistant alloy according to the present invention, an Fe-base alloy, a Co-base alloy or a Ni-base alloy having an excellent corrosion resistance can be preferably used as the matrix metal. Examples of the corrosion-resistant Fe-base alloy include an austenitic stainless steel, a maltensitic stainless steel and a ferritic stainless steel.

Examples of the corrosion-resistant Co-base alloy include stellite Co alloys, for example, a Co-Cr-W-base alloy and a Co-Ni-Cr-W-base alloy.

A hastelloy alloy, an inconel alloy and a cormonoy alloy may be used as the Ni-base alloy, and specific examples thereof include a Ni-Cr-Si-base alloy and a Ni-Cr-Fe-W-base alloy.

In the production of the alloy of the present invention, it is preferred to use a powder mixture or a granulated powder comprising the above-described at least one matrix metal powder and, incorporated therein, 70% by weight or less of a finely divided vanadium carbide powder having a particle diameter of 10 μm or less, or a cored wire comprising a pipe of the matrix metal and, filled and sealed into the pipe, the above-described vanadium carbide powder. VC is preferred as the vanadium carbide powder.

The particle diameter of the VC powder should be 10 μm or less for the purpose of realizing a good state of dispersion. It is preferably 5 μm or less, still preferably 3 μm or less. It was found that when the particle diameter of the VC powder exceeds 10 μm, not only is it difficult to realize the above-described homogeneous dispersion but also melting of the VC powder in the matrix phase becomes insufficient. In general, it is considered that a reduction in the particle diameter complicates the handling of the powder and increases the surface area to give rise to problems of a deterioration in the handleability and occurrence of aggregation. These problems can be solved by granulating a mixed powder comprising a matrix metal and a VC powder or using a cored wire comprising a pipe of a matrix alloy and, filled into the pipe, a VC powder.

In the present invention, as described above, the amount of the vanadium carbide can be properly selected in an amount of 70% by weight or less depending upon the intended abrasion resistance property. However, when the matrix metal comprises an Fe-base alloy, the amount of the vanadium carbide is preferably 10% by weight or less, still preferably 7.5% by weight.

On the other hand, when the matrix metal comprises a Co-base alloy or a Ni-base alloy, the amount of the vanadium carbide is preferably 70% by weight or less. In general, the larger the vanadium carbide content, the better the abrasion resistance. The addition of the vanadium carbide in an amount exceeding the above-described upper limit unfavorably deteriorates the toughness and the abrasion resistance attributable to falling-off of the carbide.

In the present invention, the powder mixture etc. produced by the above-described method is heat-treated preferably in an inert gas atmosphere, such as argon gas, with a heat source having a high energy density. Specifically, the heat treatment using a heat source having a high energy density to melt the powder mixture etc. causes a fine vanadium carbide particle phase having a particle diameter of 5 μm or less to be homogeneously crystallized and/or precipitated in the matrix metal phase.

More specifically, the above-described heat treatment is preferably effected by a process wherein a powder mixture, a granulated powder or the like comprising a matrix metal powder comprised of at least one member selected from the group consisting of a Co-base alloy, a Ni-base alloy and an Fe-base alloy and a vanadium carbide powder is melted with a heat source having a high energy density to cause a fine vanadium carbide particle phase having a particle diameter of 5 μm or less to be homogeneously crystallized and/or precipitated in the matrix metal phase.

Cooling in the above-described heat treatment is preferably effected at a rate of about 100° C./sec or more for the purpose of giving rise to a good state of crystallization or precipitation of the vanadium carbide particle phase. Such rapid cooling can be realized by forced air cooling and forced water cooling. The present inventors have found that, when the above-described cooling rate requirement is satisfied, the VC dissolved in a solid solution form in the matrix metal can be surely crystallized or precipitated in a fine and homogeneous state.

In the above-described cooling, the vanadium carbide particle phase once melted in the matrix metal phase crystallizes and/or precipitates.

Specifically, in the melting and cooling, the VC is substantially completely melted and then crystallized and/or precipitated as a fine particle phase. Further, in this case, the state of dispersion of VC particles is very good.

More specifically, in the corrosion-resistant and abrasion-resistant alloy provided by the above process, the homogeneous and fine vanadium carbide particle phase crystallized and/or precipitated in the matrix metal phase should have a particle diameter of 5 μm or less and occupy 10 to 65%, in terms of area, of the whole alloy phase. When the particle diameter of the vanadium carbide phase exceeds 5 μm, the toughness of the alloy per se is liable to decrease, which increases a risk of the hard particles falling off, so that an improvement in the abrasion resistance is unfavorably inhibited. When the percentage area of the vanadium carbide particle phase relative to the whole alloy phase is less than 10%, the effect of improving the abrasion resistance unfavorably lowers. On the other hand, when the percentage area exceeds 65%, there is a possibility that properties inherent in the matrix metal deteriorate.

The melting using a heat source having a high energy density can be effected by methods wherein use is made of plasma arc, laser beam heat source or hot isostatic press (H.I.P.) (hereinafter often referred to as "HIP method"). When use is made of the HIP method, a container into which the powder mixture has been sealed is treated at a high temperature under a high pressure. In this case, it is also possible to seal the following metallic member and the powder mixture into the container. When the above-described alloy is build-up welded to the surface of the following metallic member, it is preferred to use a plasma transferred arc welding method (P.T.A. method) wherein plasma arc is used as the heat source. In these melting means, heating at a temperature above 3000° C. is possible at least in an instant, which enables the above-described powder mixture to be effectively melted.

Although the carbide crystallized and/or precipitated as a result of the above-described heat treatment is consisting essentially of VC, there is a possibility that $V_2C$ occurs as an auxiliary component. Further, it is considered that, besides the above-described carbides, a very small amount of $(Fe, Cr, V, W)_{23}C_6$ precipitates. In the present invention, the presence of these unavoidable components is acceptable so far as they do not spoil the object of the present invention.

The method of modifying the surface of a metallic member according to the present invention will now be described.

The surface modification method according to the present invention is characterized in that a build-up layer comprising a corrosion-resistant and abrasion-resistant alloy provided by the above-described method is applied to the surface of a desired metallic member.

Specifically, the surface modification method of the present invention is characterized by feeding, on the surface of a base material constituting a metallic member, a powder mixture comprising a powder of a matrix metal selected from the group consisting of a Co-base alloy, a Ni-base alloy and an Fe-base alloy and a vanadium carbide powder, or an assembly comprising a pipe of the above-described matrix metal and the vanadium carbide powder and subjecting the mixture or assembly to a heat treatment using a heat source having a high energy density to form, on the surface of the base material, a build-up alloy layer comprising a matrix metal phase and, homogeneously crystallized and/or precipitated in the matrix metal phase, a fine vanadium carbide particle phase having a particle diameter of 5 μm or less.

Further, in the above-described heat treatment, it is preferred to use a plasma transferred arc welding method (P.T.A method) wherein plasma arc is used as the heat source. As described above, in these melting means, heating at a temperature above 3000° C. is possible at least in an instant, which enables the powder mixture, granulated powder, etc. to be effectively melted.

Other conditions, i.e., cooling conditions, and the state of precipitation or dispersion of the vanadium carbide particle phase may be the same as those described above. In particular, cooling in the heat treatment at a rate of about 100° C./sec or more is preferred from the viewpoint of surely giving rise to a good state of crystallization or precipitation of the vanadium carbide particle phase. Such rapid cooling can be realized by forced air cooling and forced water cooling. The present inventors have found that, when the above-described cooling rate requirement is satisfied, the VC dissolved in a solid solution form in the matrix metal can be crystallized or precipitated in a finer and more homogeneous state. It is expected that a lower cooling rate is preferred from the viewpoint of preventing the occurrence of cracking in the interface of the base material portion of the metallic member and the build-up layer. However, the present inventors have found that a lowering in the cooling rate is not always effective for realizing the above-described state of precipitation of the VC particle phase.

Further, in the present invention, with respect to the cooling, for example, the above-described method can be effected while forcibly cooling the metallic member on which a build-up layer is to be formed.

In the present invention, the above-described heat treatment can be efficiently effected by using a weaving method. FIGS. 18 and 19 are embodiments of a weaving pattern in the case where a build-up layer is formed by using a plasma transferred arc welder. The weaving may be effected by reciprocating motion in a circular arc form (see FIG. 18) or a zigzag form (see FIG. 19).

FIG. 20 is an explanatory diagram of an embodiment wherein the build-up layer is formed by using a plasma transferred arc welder equipped with a single torch. In the plasma transferred arc welder in this embodiment, a torch body 10 is provided with a torch 11 for effecting plasma transferred arc welding and a powder feed pipe 13 for feeding a raw material powder to the torch. A build-up layer 21 comprising the above-described corrosion-resistant and abrasion-resistant alloy can be formed by moving the plasma transferred arc welder and the metallic member 20 in such a manner that a proper positional relationship between them can be maintained.

The above-described method for modifying the surface of a metallic member can be applied to mechanical parts which should partly have good corrosion resistance, sliding properties and abrasion resistance.

In the conventional method for modifying the surface of metallic parts constituting machinery, the surface of the metallic parts are treated by a surface cladding or surface alloying method using plating, CVD, PVD or a high temperature heat source. For example, in order to improve the corrosion resistance and abrasion resistance of various tools or screws of plastic injection molding machines, it is a common practice to harden screws to enhance the hardness followed by plating or PVD or CVD. On the other hand, in cylinders used in combination with the screws, a general method used in the art is to nitride the internal surface of a nitriding steel as a material for the cylinders, or coat a self-fluxing alloy having excellent corrosion resistance and abrasion resistance on the whole or part of the internal wall of the cylinders, or fit an alloy liner having excellent corrosion resistance and abrasion resistance on the internal wall of the cylinders.

In the above-described conventional method, however, the adhesion between the base material of the metallic parts and the modified surface layer is so low that peeling or cracking often occurs upon exposure to a thermal load or even under a relatively low load. Further, the surface-modified parts provided by the conventional method are not always satisfactory in abrasion resistance. In addition, in parts for plastic molding machines as described above, portions where plastic as a raw material is moved (particularly a raw material feeding portion) are severely abraded by the plastic as the raw material. Further, in this case, in a plastic injection or ejection portion, problems including damage by corrosion due to a gas generated from the raw material plastic and damage by abrasion under a high pressure occur.

In the method for modifying the surface of a metallic member according to the present invention, the adhesion between the surface-modified layer and the base material is very good, and the surface layer is excellent in the corrosion resistance, sliding property and abrasion resistance. Thus the present invention very useful as a method for modifying the surface of metallic members which should partly have corrosion resistance or abrasion resistance, such as the above-described parts for plastic molding machines.

The present invention will now be described in more detail with reference to the following Examples, though it is not limited to these Examples only.

In the following Examples, Examples 1 to 6 are embodiments wherein the formation of a corrosion-resistant and abrasion-resistant alloy or a build-up layer is effected by a weaving system, and Examples 7 to 9 are embodiments wherein use is made of a plasma transferred arc welder.

EXAMPLE 1

Figure 2:
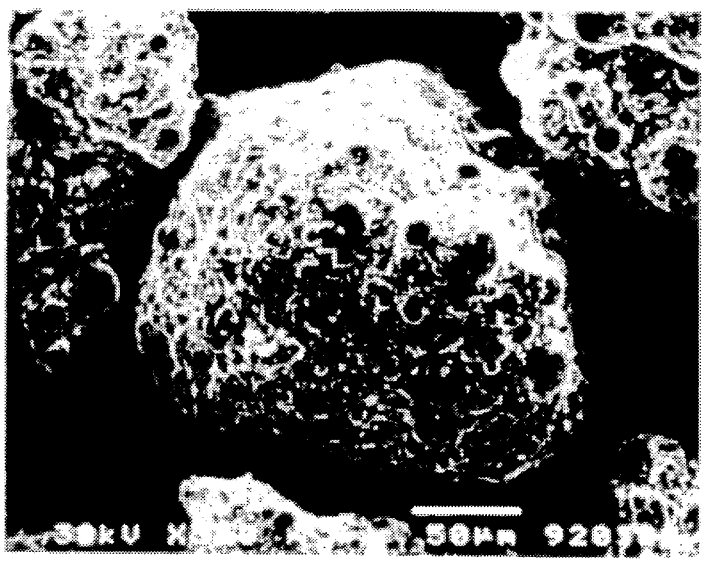
FIG. 2 is a photomicrograph of a granulated powder used in an example of the present invention.

A VC powder (average particle diameter: 1.7 μm) was added in amounts of 20% by weight, 25% by weight and 40% by weight to a Co-base alloy powder (a matrix metal powder) comprising, in terms of by weight, 0.2% of C, 0.6% of Si, 26.5% of Cr, 2.7% of Ni, 5.4% of Mo and 0.3% of Fe with the balance consisting essentially of Co, and the powder mixtures were granulated to provide materials for alloys. An example of the state of the granulated powder is shown in FIGS. 1 and 2.

Each sample of these granulated powders was subjected to weaving at a small pitch with a plasma transferred arc welder and heated to a temperature around the melting point of VC (about 2830° C.) to melt the samples to provide corrosion-resistant and abrasion-resistant alloys of the present invention.

The resultant sample alloys were subjected to measurement of hardness. The results are given in the following Table 1.

TABLE 1

| Sample No. | Proportion of mixing of VC (% by weight) | Hardness (Hv) |
|---|---|---|
| 1 | 20 | 550–620 |
| 2 | 25 | 750–850 |
| 3 | 40 | 950–1150 |

Figure 3:
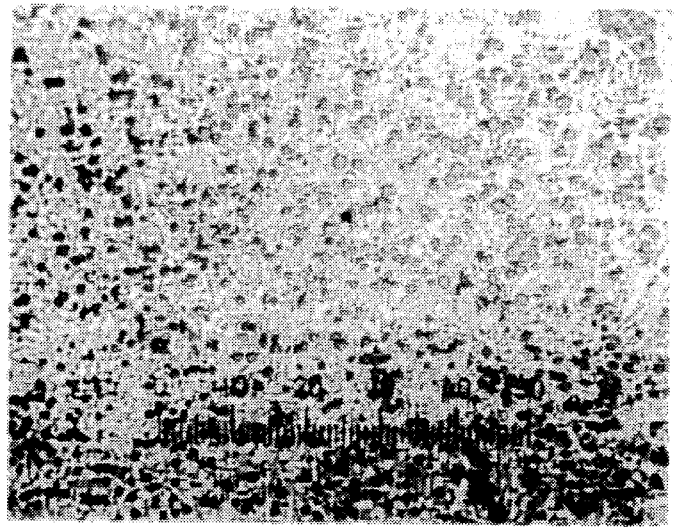
FIG. 3 is a photomicrograph of the metallic structure of the cross-section of a corrosion-resistant and abrasion-resistant alloy prepared from sample 1 in Example 1 of the present invention.
Figure 4:
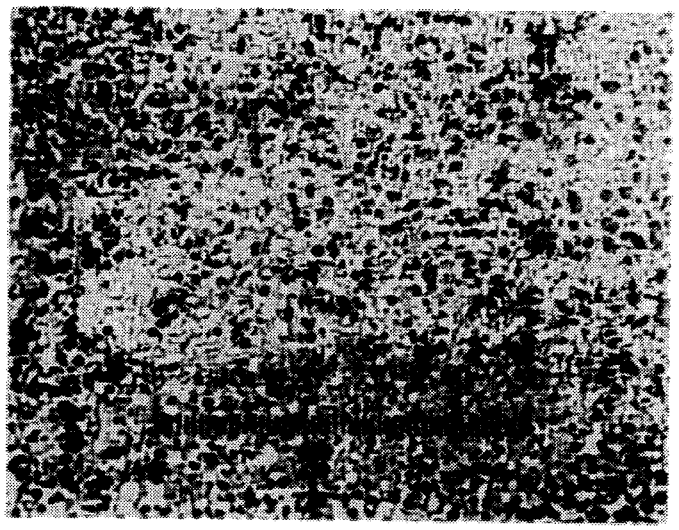
FIG. 4 is a photomicrograph of the metallic structure of the cross-section of a corrosion-resistant and abrasion-resistant alloy prepared from sample 2 in Example 1 of the present invention.
Figure 5:
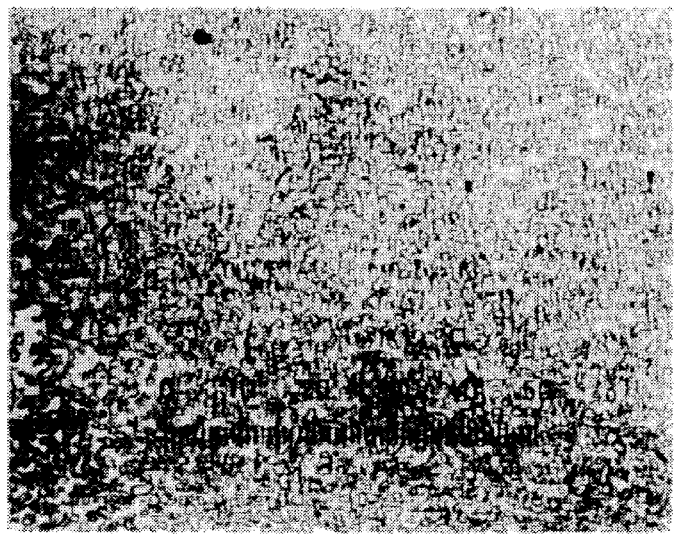
FIG. 5 is a photomicrograph of the metallic structure of the cross-section of a corrosion-resistant and abrasion-resistant alloy prepared from sample 3 in Example 1 of the present invention.

Photomicrographs (magnification: ×400) of metallic structures of samples 1, 2 and 3 prepared above are shown in FIGS. 3, 4 and 5. It is apparent that, in all the metallic structures, a fine VC particle phase (composed mainly of particles having a diameter of about 1 µm or less) is homogeneously distributed in the matrix metal phase.

Then, each sample alloy was subjected to a corrosion test. The corrosion test was effected by using a 6N aqueous hydrochloric acid solution and a 6N aqueous nitric acid solution as a corroding solution. The results are given in the following Table 2.

TABLE 2

| | Amount of corrosion (mg/cm$^2$ · hr) | |
|---|---|---|
| Sample No. | Aqueous hydrochloric acid solution | Aqueous nitric acid solution |
| 1 | 0.04 | 0.08 |
| 2 | 0.05 | 0.08 |
| 3 | 0.05 | 0.11 |

Further, each sample alloy was subjected to an abrasion test. An Ohkoshi type abrasion tester was used as an abrasion tester, and the abrasion was measured by using SKD-11 (HRC58) as the opposite material under conditions of a final load of 18.9 kgf and a friction distance of 600 m. SKD-11 is a steel material having the following composition: C: 1.40–1.60%; Si: not more than 0.40%; Mn: not more than 0.60%; P: not more than 0.030%; S: not more than 0.030%; Cr: 11.0–13.0%; Mo: 0.80–1.2%; and V: 0.20–0.50%. The results are given in FIG. 8. As can be seen from the test results, all the sample alloys 1, 2 and 3 according to the present invention exhibited a good abrasion resistance, and there was a tendency that the abrasion resistance improved with an increase in the amount of addition of hard particle VC.

EXAMPLE 2

A VC powder (average particle diameter: 1.7 µm) was added in an amount of 7.5% by weight to an Fe-base alloy powder (a matrix metal powder) comprising, in terms of by weight, 1.2% of C, 0.6% of Si, 0.3% of Mn, 4.5% of Cr, 5.1% of Mo, 6.3% of W, 3.1% of V and 8.4% of Co with the balance consisting essentially of Fe, and the powder mixture was granulated to provide a material for an alloy.

The corrosion-resistant and abrasion-resistant alloy of the present invention was produced in the same manner as that of Example 1, except that the granulated powder provided just above was used.

The resultant sample alloy had a Hv hardness of 950 to 1000. Accordingly, it is apparent that the use of the Fe-base alloy as the matrix metal can provide a higher hardness than that in the case of use of the Co-base alloy even when the amount of VC is as small as about 7.5%.

Figure 6:
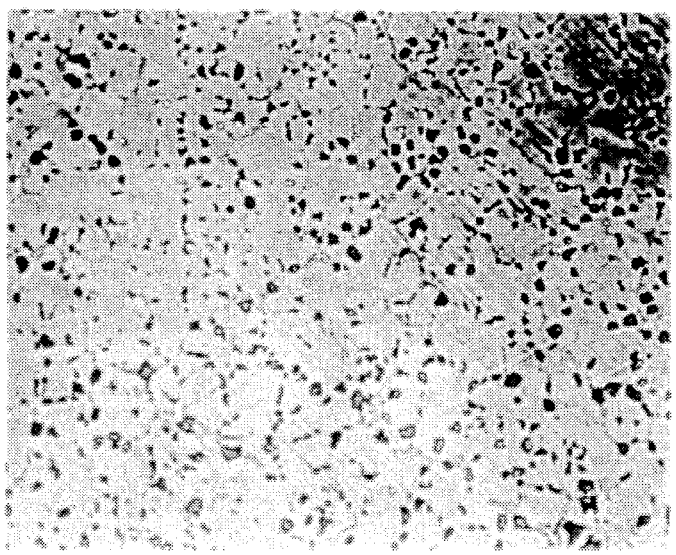
FIG. 6 is a photomicrograph of the metallic structure of the cross-section of a corrosion-resistant and abrasion-resistant alloy prepared in Example 2 of the present invention.

FIG. 6 is a photomicrograph (magnification: ×400) of the metallic structure of the sample alloy provided in this Example. As can be seen from the photomicrograph, a fine VC particle phase (particle diameter: about 1 µm) is homogeneously distributed in the matrix metal phase.

Then, this sample alloy (No. 4) was subjected to a corrosion test in the same manner as that of Example 1. As a result, the amount of corrosion (mg/cm$^2$·hr) was 0.08 as measured in the aqueous hydrochloric acid solution and 62.8 as measured in the aqueous nitric acid solution.

Further, the sample alloy (No. 4) was subjected to an abrasion test. An Ohkoshi type abrasion tester was used as an abrasion tester, and the abrasion was measured by using SKD-11 (HRC58) as the opposite material under conditions of a final load of 18.9 Kgf and a friction distance of 600M. The results are shown in FIG. 8. As can be seen from the test results, this sample alloy as well had a good abrasion resistance.

EXAMPLE 3

A VC powder (average particle diameter: 1.7 µm) was added in an amount of 19% by weight to a Ni-base alloy powder (a matrix metal powder) comprising, in terms of by weight, 0.042% of C, 0.30% of Si, 0.008% of B, 20.50% of Cr, 0.27% of Fe, 0.29% of Mn and 2.70% of Ti with the balance consisting essentially of Ni to provide a powder mixture.

The powder mixture sample was heat-treated by using a transferred arc powder welder in the same manner as that of Example 1 to provide the corrosion-resistant and abrasion-resistant alloy of the present invention.

The resultant sample alloy had a Hv hardness of 510 to 590.

Figure 7:
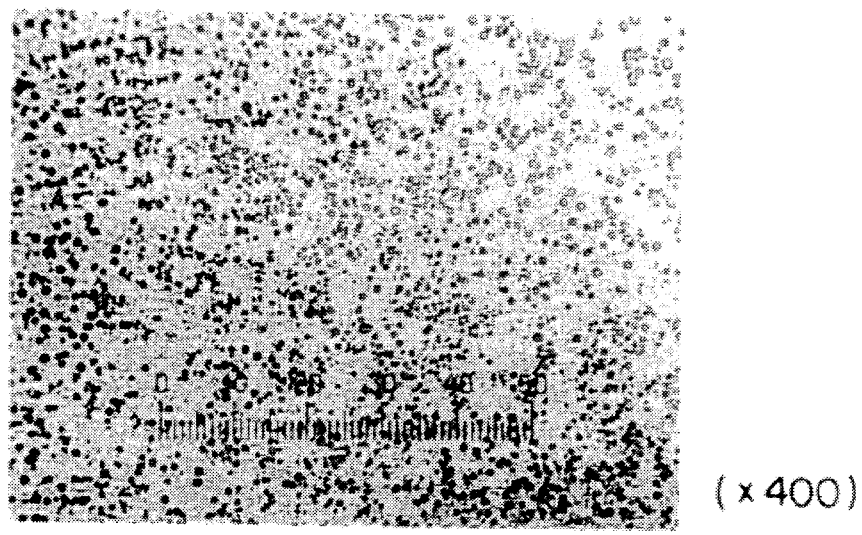
FIG. 7 is a photomicrograph of the metallic structure of the cross-section of a corrosion-resistant and abrasion-resistant alloy prepared in Example 3 of the present invention.

FIG. 7 is a photomicrograph (magnification: ×400) of the metallic structure of the sample alloy provided in this Example. As can be seen from the photomicrograph, a fine VC particle phase (particle diameter: about 1 µm) is homogeneously distributed in the matrix metal phase.

Then, this sample alloy (No. 5) was subjected to a corrosion test in the same manner as that of Example 1. As a result, the amount of corrosion (mg/cm$^2$·hr) was 0.06 as measured in the aqueous hydrochloric acid solution and 0.09 as measured in the aqueous nitric acid solution.

Further, the sample alloy (No. 5) was subjected to an abrasion test. An Ohkoshi type abrasion tester was used as an abrasion tester, and the abrasion was measured by using SKD-11 (HRC58) as the opposite material under conditions of a final load of 18.9 kgf and a friction distance of 600 m. The results are shown in FIG. 8. As can be seen from the test results, this sample alloy as well had a good abrasion resistance.

COMPARATIVE EXAMPLE

A matrix metal powder having a composition specified in the following Table 3 was mixed with hard particle powders having an average particle diameter of 70 µm specified in the following Table 3, and the powder mixture samples were subjected to weaving with a plasma transferred arc welder in the same manner as that of Example 1 and heated to a temperature of the melting point (about 2730° C.) of the hard particle powder or above, thereby melting the samples. After the melting operation, the samples were allowed to stand for cooling, thereby providing alloys containing hard particles. The sample alloys (A, B and C) thus produced were subjected to measurement of hardness, and the results are given in the following Table 3;

TABLE 3

| Sample | Composition of matrix metal (% by weight) | Hard particles (% by weight) |
| --- | --- | --- |
| A | 0.6 Si, 26.5 Cr, 0.3 Fe, 0.2 C 2.7 Ni, 5.4 Mo, Co (balance) | VC25 |
| B | 0.6 Si, 26.5 Cr, 0.3 Fe, 0.2 C 2.7 Ni, 5.4 Mo, Co (balance) | VC40 |
| C | 0.6 Si, 26.5 Cr, 0.3 Fe, 0.2 C 2.7 Ni, 5.4 Mo, Co (balance) | VC50 |

The hardness (Hv) of the sample alloys was 550 to 600 for sample A, 600 to 750 for sample B and 650 to 750 for sample C.

Further, the sample alloys were subjected to a corrosion test in the same manner as that of Example 1. The results are given in the following Table 4.

TABLE 4

| Sample No. | Amount of corrosion (mg/cm² · hr) | |
| --- | --- | --- |
| | Aqueous hydrochloric acid solution | Aqueous nitric acid solution |
| A | 0.05 | 0.07 |
| B | 0.04 | 0.08 |
| C | 0.04 | 0.09 |

Further, the sample alloys A, B and C were subjected to an abrasion test in the same manner as that of Example 1. The results are shown in FIG. 9.

Figure 9:
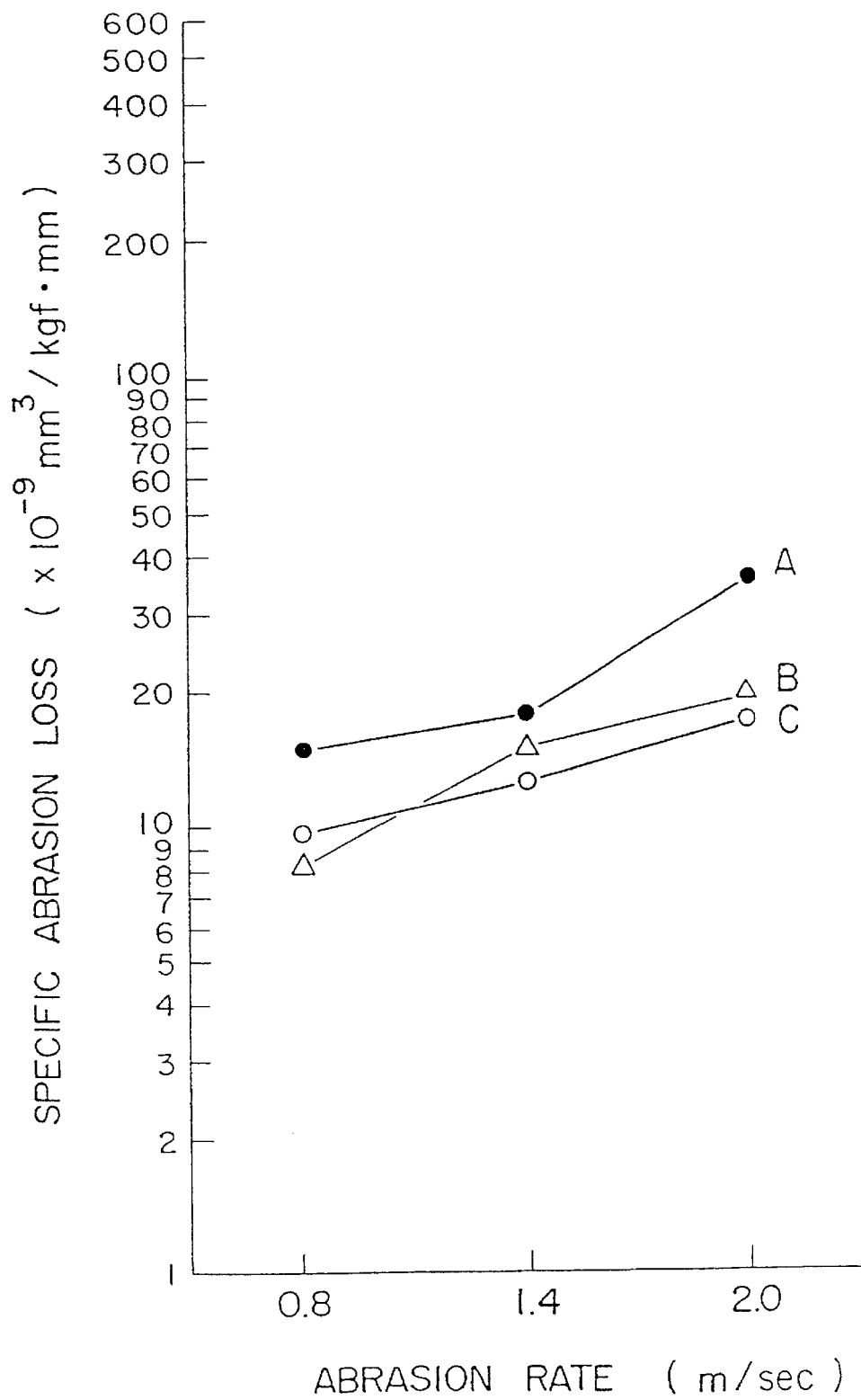
FIG. 9 is a graph showing the results of an abrasion test for Comparative Example.

From a comparison of FIG. 8 with FIG. 9, it is apparent that the use of a granulated powder according to the present invention provided a smaller specific amount of abrasion, i.e., a better abrasion resistance, than the use of a physically mixed powder due to the difference in the particle diameter of VC although VC had been added in both cases.

Also from these results, it is estimated that, in FIG. 9, the particle diameter varies in the range of from 10 to 50 μm with some VC particles remaining unmelted, which lowers the abrasion resistance.

EXAMPLE 4

A VC powder (average particle diameter: 1.7 μm) was added in amounts of 20% by weight, 25% by weight and 40% by weight to a Co-base alloy powder having a composition comprising, in terms of by weight, 0.15 to 0.35% of C, 0.90 to 1.30% of Si, 1.00% or less of Mn, 0.030% or less of P, 0.030% or less of S, 2.50 to 3.50% of Ni, 24.0 to 28.0% of Cr, 5.00 to 6.00% of Mo and 1.50% or less of Fe with the balance consisting essentially of Co, and the powder mixtures were granulated to provide materials for alloys.

These granulated powders were build-up welded to a steel material (SCM440) by weaving with a plasma transferred arc welder to form a corrosion-resistant and abrasion-resistant alloy layer on the steel material. SCM440 is a steel material having the following composition: C: 0.38–0.43%; Si: 0.15–0.35%; Mn: 0.60–0.85%; P: not more than 0.030%; S: not more than 0.030%; Cr: 0.90–1.20%; and Mo: 0.15–0.30%. The plasma transferred arc welding were effected under the following conditions.

Current: 140 A
Voltage: 40 V
Flow rate of plasma gas: 1.4 liters/min
Flow rate of shield gas: 16 liters/min
Flow rate of powder gas: 3.1 liters/min
Feed rate of powder: 11.8 g/min
Number of times of weaving: 46 times/min
Width of weaving: 7 mm
Welding rate: 80 mm/min
Extension: 8 mm The particle size of the granulated powder used in the above welding was in the range of from 160 to 250 mesh, and the peak particle size in the particle size distribution was 200 mesh or less.

Figure 10:
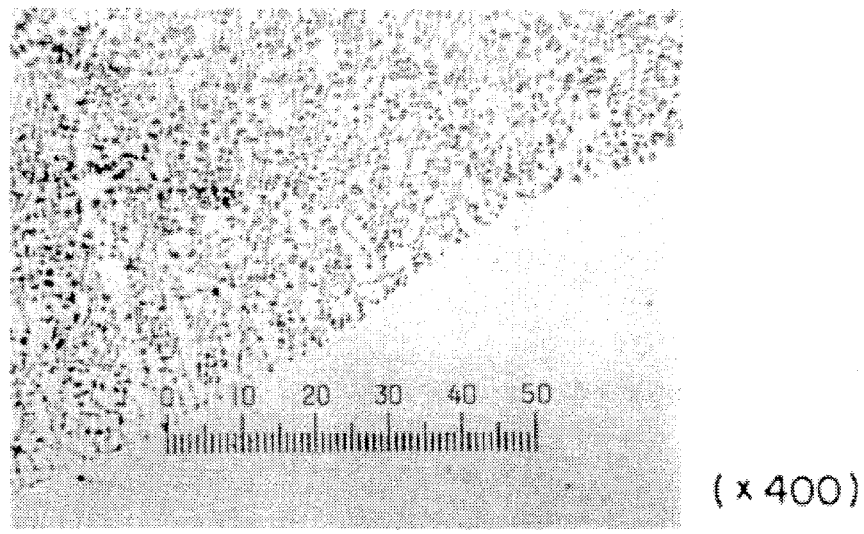
FIG. 10 is a photomicrograph of the metallic structure of the cross-section of a metallic member having a surface modified by the first method described in Example 4 of the present invention.
Figure 11:
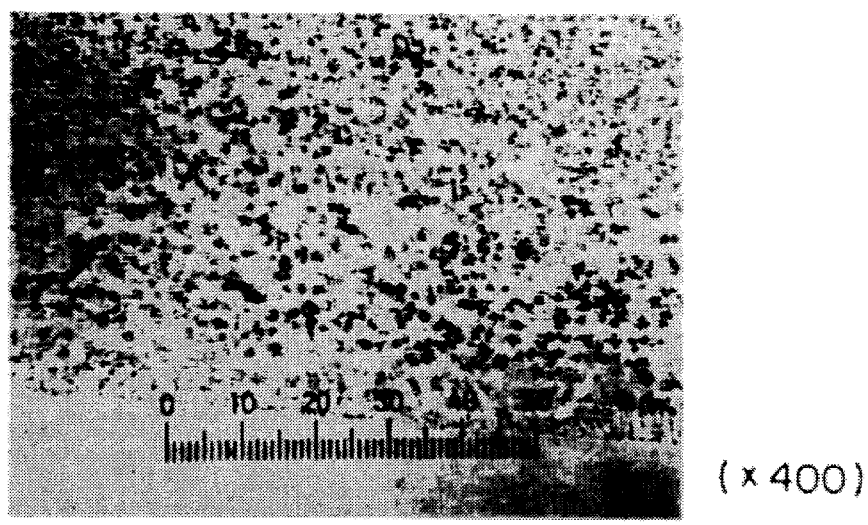
FIG. 11 is a photomicrograph of the metallic structure of the cross-section of a metallic member having a surface modified by the second method described in Example 4 of the present invention.
Figure 12:
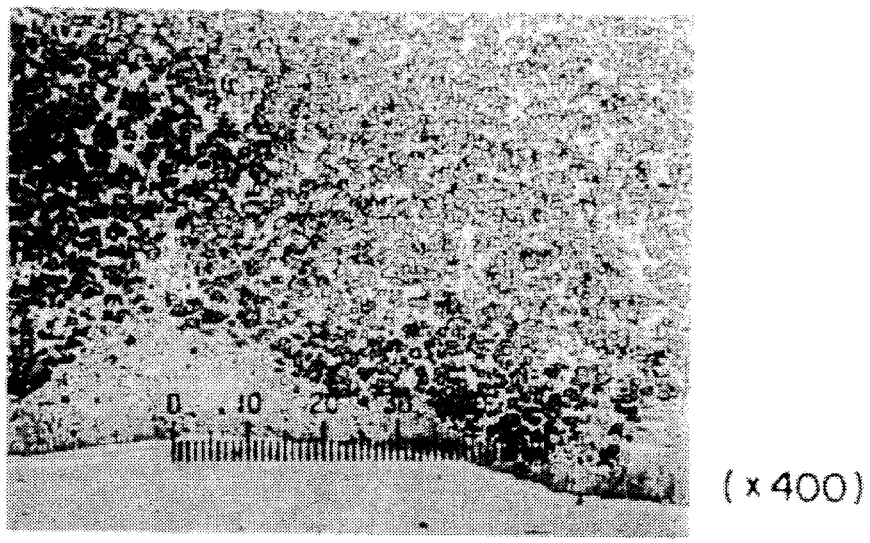
FIG. 12 is a photomicrograph of the metallic structure of the cross-section of a metallic member having a surface modified by the third method described in Example 4 of the present invention.

Photomicrographs of metallic structures of the cross-section of the build-up welds thus provided are shown in FIGS. 10 to 12 (respectively corresponding to the addition of VC in amounts of 20% by weight, 25% by weight and 40% by weight). As can be seen from the photomicrographs, a fine VC particle phase having a diameter of 1 μm or less is homogeneously dispersed and precipitated (magnification: ×400).

The surface-modified metallic members thus provided were subjected to measurement of peeling strength and shear strength. The results are given in the following Table 5.

TABLE 5

| Amount of addition of VC (% by weight) | Peeling strength (kgf/mm²) |
| --- | --- |
| 20 | 54 |
| 25 | 53 |
| 40 | 49 |

Figure 15:
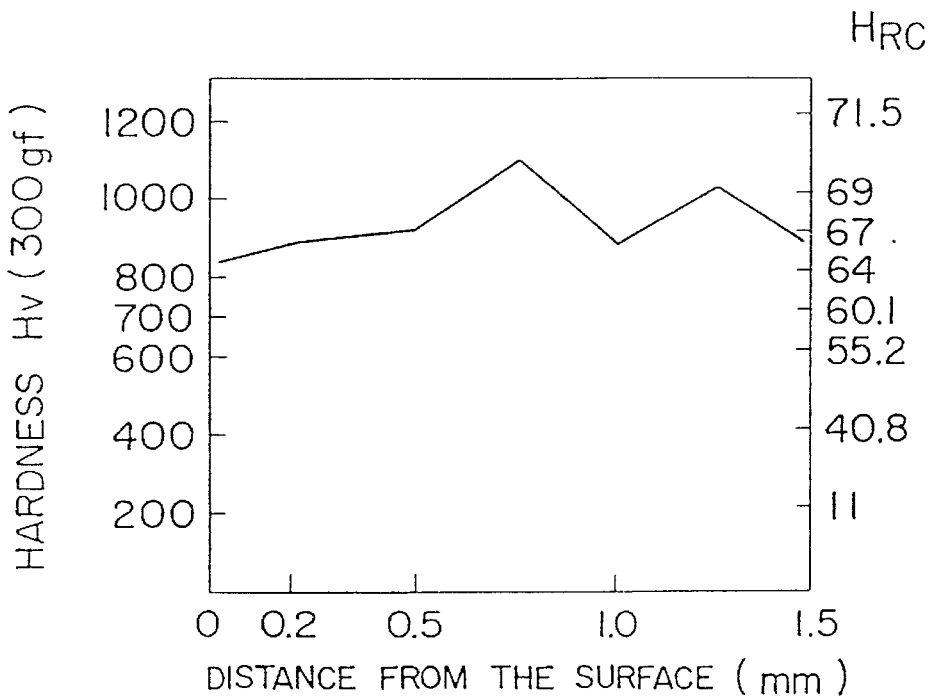
FIG. 15 is a graph showing the results of measurement of the hardness of a metallic member having a surface modified by the third method described in Example 4 of the present invention.

Further, the surface-modified metallic members were subjected to measurement of hardness. The results are shown in FIGS. 13 to 15 (respectively corresponding to the addition of VC in amounts of 20% by weight, 25% by weight and 40% by weight). Further, the surface-modified metallic members were subjected to a corrosion test. The results were the same as those in Example 1.

From the above-described test results, it is apparent that the metallic members of the present invention eliminated problems of the prior art, that is, (1) lack of strength of bonding between the base material and the build-up weld and (2) lowering in the abrasion resistance attributable to coarsening, uneven distribution and other unfavorable phenomena of added particles. The metallic members of the present invention also had excellent metallic member properties.

EXAMPLE 5

Figure 16:
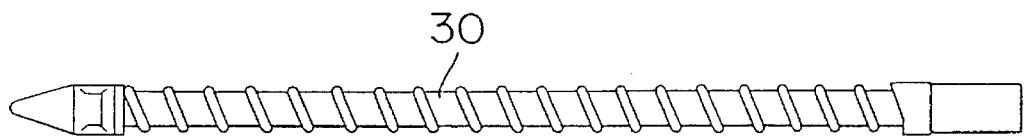
FIG. 16 is an outside view of an injection molding screw subjected to surface modification in Example 5 of the present invention.

An injection molding screw, wherein the surface of the member had been modified, was provided by using the same materials as those used in Example 4 in the same manner as that of Example 4. FIG. 16 is an outside view of this injection molding screw 30. A practical test was effected to compare the injection molding screw provided above with an injection molding screw subjected to hardening followed by plating of the surface thereof with hard chromium according to the conventional method. In the practical test, the service life of the screw surface-modified according to the conventional method was used as a reference, and the service life of the screw according to the present invention was calculated as a service life ratio based on the reference value. As a result, the service life ratio of the injection molding screw according to the present invention was 3.5, whereas the service life ratio of the injection molding screw provided by the conventional method was 1.0.

As is apparent also from the above-described results, in the injection molding screw according to the present invention, a remarkable improvement in the service life could be attained over that of the conventional injection molding screw.

EXAMPLE 6

Figure 17:
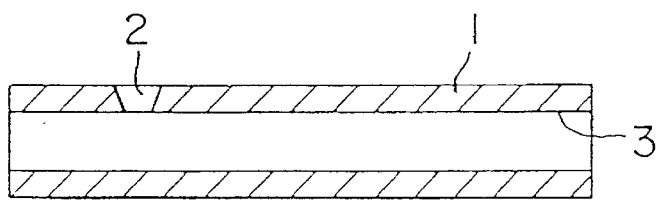
FIG. 17 is a cross-sectional view of an injection molding cylinder subjected to surface modification in Example 6 of the present invention.

A surface-modified injection molding cylinder was provided by using the same materials as those used in Example 4 in the same manner as that of Example 4. The cross-sectional view of the injection molding cylinder is shown in FIG. 17. In the drawing, reference numeral 1 designates a cylinder body, numeral 2 a plastic raw material feed port and numeral 3 an internal wall of the cylinder to be surface-treated.

A practical test was effected to compare the injection molding cylinder provided above with an injection molding cylinder produced by subjecting the internal surface of an injection molding cylinder body comprising SACM645 to a nitriding treatment according to the conventional method. SACM645 is a steel material having the following composition: C: 0.40–0.50%; Si: 0.15–0.50%; Mn: not more than 0.60%; P: not more than 0.030%; S: not more than 0.030%; Cr: 1.30–1.70%; Mo: 0.15–0.30%; and Al: 0.70–1.20%. In the practical test, the service life of the cylinder surface-modified according to the conventional method was used as a reference, and the service life of the cylinder according to the present invention was calculated as a service life ratio based on the reference value. As a result, the service life ratio of the injection molding cylinder according to the present invention was 3.6, whereas the service life ratio of the injection molding cylinder provided by the conventional method was 1.0.

As is apparent also from the above-described results, in the injection molding cylinder according to the present invention, a remarkable improvement in the service life could be attained over that of the conventional injection molding screw.

EXAMPLE 7

A VC powder (average particle diameter: 1.7 μm or less) was added in an amount of 20% by weight to a Co-base alloy powder (a matrix metal powder) comprising, in terms of by weight, 0.2% of C, 0.6% of Si, 26.5% of Cr, 2.7% of Ni, 5.4% of Mo and 0.3% of Fe with the balance consisting essentially of Co to provide a material for an alloy.

The corrosion-resistant and abrasion-resistant alloy according to the present invention was provided from the powder mixture sample with a plasma transferred arc welder shown in FIG. 20. The cooling rate was controlled at 100° C./sec or more.

The resultant sample alloy had a Hv hardness of 580 to 650.

Figure 21:
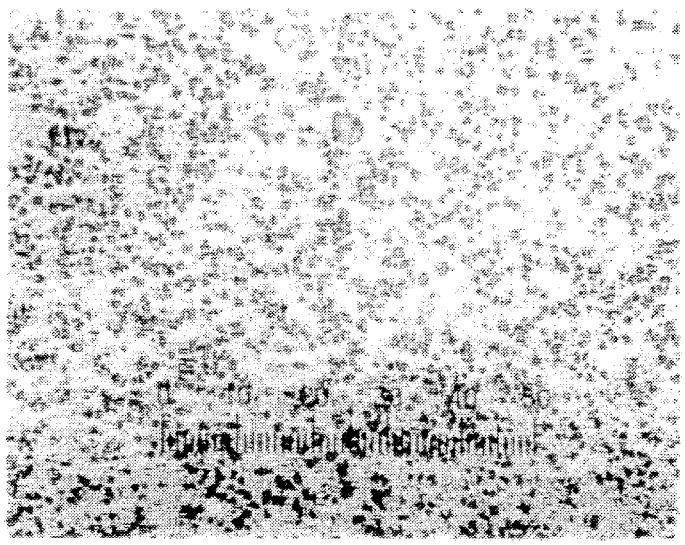
FIG. 21 is a photomicrograph of the metallic structure of the cross-section of a corrosion-resistant and abrasion-resistant alloy prepared in Example 7 of the present invention.

FIG. 21 is a photomicrograph (magnification: ×400) of the metallic structure of the sample alloy provided in this Example. As can be seen from the photomicrograph, a fine VC particle phase (composed mainly of particles having a diameter of about 1 μm or less) is homogeneously distributed in the matrix metal phase.

Then, this sample alloy was subjected to a corrosion test. The corrosion test was effected by using a 6 N aqueous hydrochloric acid solution and a 6 N aqueous nitric acid solution as a corroding solution. The results are given in the following Table 6.

TABLE 6

| Amount of corrosion (mg/cm² · hr) | |
|---|---|
| Aqueous hydrochloric acid solution | Aqueous nitric acid solution |
| 0.05 | 0.09 |

Further, the sample alloy was subjected to an abrasion test. An Ohkoshi type abrasion tester was used as an abrasion tester, and the abrasion was measured by using SKD-11 (HRC58) as the opposite material under conditions of a final load of 18.9 kgf and a friction distance of 600 m. The results are given in FIG. 24. As can be seen from the test results, the alloy according to the present invention had a good abrasion resistance.

EXAMPLE 8

The alloy of the present invention was formed by using a cored wire comprising a hollow pipe comprising the same Fe-base alloy as that used in Example 2 and, filled and sealed into the hollow pipe, a VC powder (diameter of the pipe: 1.6 mmϕ, percentage packing: about 30%) and a plasma wire welder of the same type as shown in FIG. 20 and equipped with wire feed means. The welding was effected under conditions of a welding rate of 160 mm/min and a welding current of 160 A and an arc voltage of 22 V.

Figure 22:
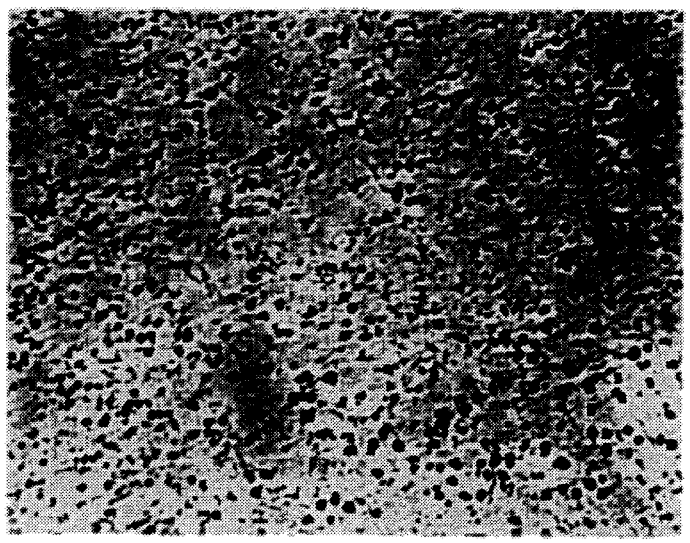
FIG. 22 is a photomicrograph of the metallic structure of the cross-section of a corrosion-resistant and abrasion-resistant alloy prepared in Example 8 of the present invention.

The resultant sample alloy had a Hv hardness of 750 to 800. FIG. 22 is a photomicrograph (magnification: ×400) of the metallic structure of the sample alloy provided in this Example. As can be seen from the photomicrograph, a fine VC particle phase (composed mainly of particles having a diameter of about 1 μm or less) is homogeneously distributed in the matrix metal phase.

Figure 24:
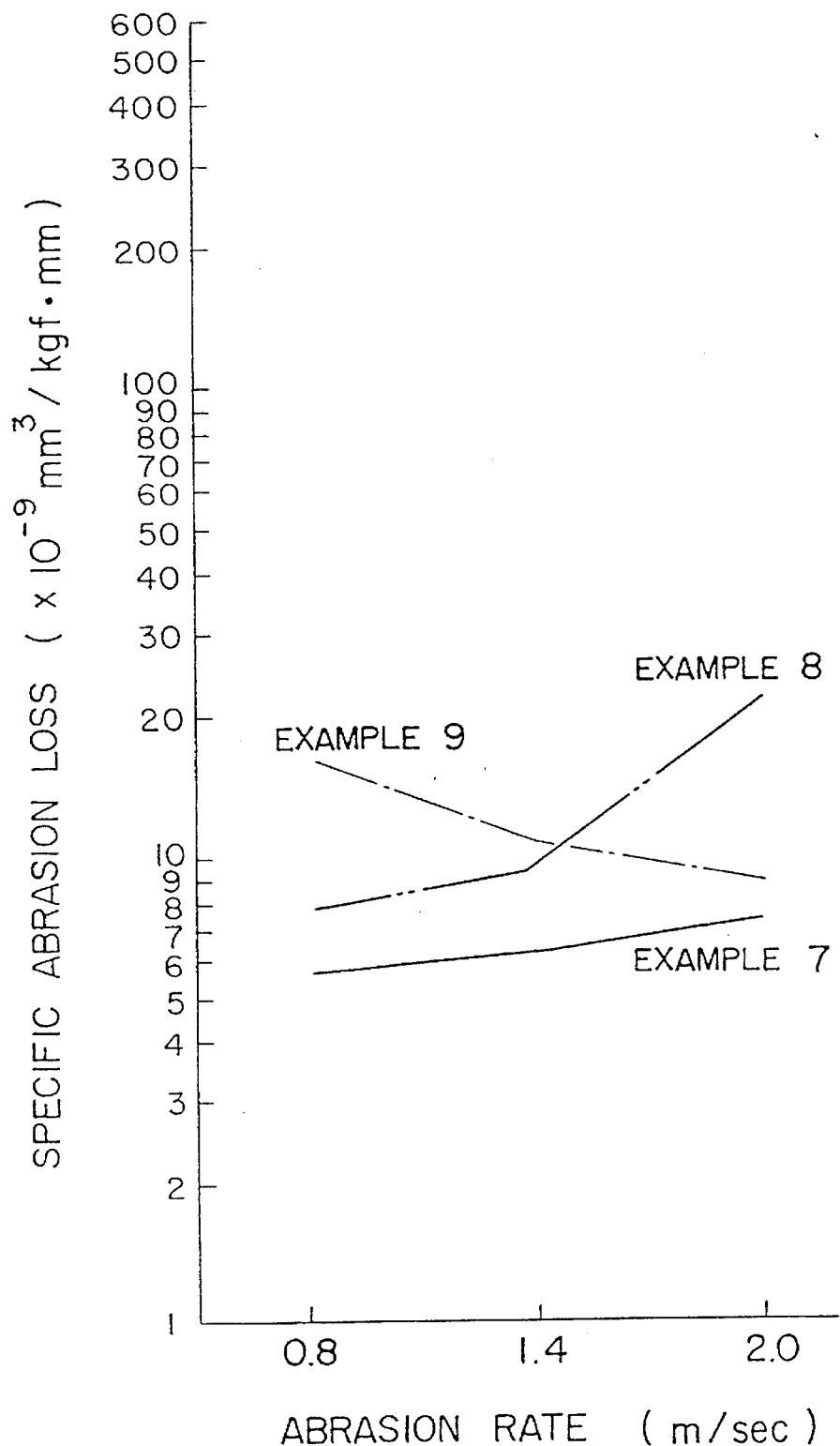
FIG. 24 is a graph showing the results of an abrasion test for corrosion-resistant and abrasion-resistant alloys prepared in Examples 7 to 9 of the present invention.

Then, this sample alloy was subjected to a corrosion test and an abrasion test. The results were as follows. The amount of corrosion in a 6 N aqueous hydrochloric acid solution was 0.12 mg/cm²·hr. The abrasion test was effected by using an Ohkoshi type abrasion tester in the same manner as that of Example 7. The results are shown in FIG. 24.

EXAMPLE 9

The alloy of the present invention was provided by using the same Ni-base alloy powder and VC powder as those used in Example 3 and a plasma transferred arc welder shown in FIG. 20.

The resultant sample alloy had a Hv hardness of 550 to 650.

Figure 23:
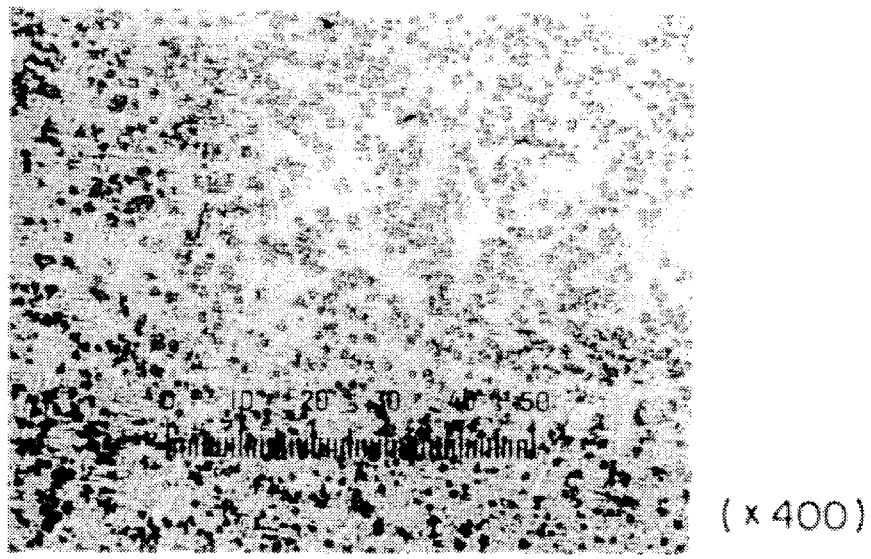
FIG. 23 is a photomicrograph of the metallic structure of the cross-section of a corrosion-resistant and abrasion-resistant alloy prepared in Example 9 of the present invention.

FIG. 23 is a photomicrograph (magnification: ×400) of the metallic structure of the sample alloy provided in this Example. As can be seen from the photomicrograph, a fine VC particle phase (composed mainly of particles having a diameter of about 1 μm or less) is homogeneously distributed in the matrix metal phase.

Then, this sample alloy was subjected to an abrasion test in the same manner as that of Example 7. The results are shown in FIG. 24.

The amount of corrosion was 0.01 mg/cm$^2$·hr as measured in a 6 N aqueous hydrochloric acid solution and 0.07 mg/cm$^2$·hr as measured in a 6 N aqueous nitric acid solution.

The alloy of the present invention can provide a significant improvement in the corrosion resistance and abrasion resistance over the conventional alloy and stably maintain the corrosion resistance and abrasion resistance on that level. Further, in the alloy production method according to the present invention, not only vanadium carbide can be completely melted by a single melting operation but also a fine particle phase having a particle diameter of 5 μm or less can be homogeneously precipitated and crystallized, which leads to excellent effects of improving the corrosion resistance and abrasion resistance of alloys in a small number of steps and remarkably enhancing the working life and durability of various metallic members. Further, the material for alloys according to the present invention is suitable for facilitating the production of the above-described alloy, can be used in a form arbitrarily selected from a powder mixture and other forms, such as a cored wire, depending upon welders and welding conditions used, which can contribute to an enhancement in the practicability.

We claim:

1. A method of producing an alloy having excellent corrosion resistance and abrasion resistance, comprising the steps of:

providing a powder mixture or VC-powder-containing wire comprising a matrix metal comprising at least one alloy selected from the group consisting of an Fe-base alloy, a Co-base alloy and a Ni-base alloy and a VC powder having a particle diameter of 10 μm or less;

melting the at least one alloy and the VC powder with a heat source having a high energy density to provide a resultant melt; and cooling the resultant melt to homogeneously crystallize, homogeneously precipitate, or homogeneously crystallize and precipitate the VC, wherein the particle diameter of the VC is reduced to 5 μm or less in said matrix metal phase.

2. A method according to claim 1, wherein said melting with a heat source having a high energy density is effected by any of plasma welding, laser beam and hot isostatic press.

3. A method for producing a surface-modified metallic member, comprising forming an alloy layer having excellent corrosion resistance and abrasion resistance on a predetermined portion of a metallic member by a method according to claim 1 or 2.

* * * * *